No. 832,456. PATENTED OCT. 2, 1906.
B. COHEN.
ANIMAL HEAD.
APPLICATION FILED APR. 24, 1906.
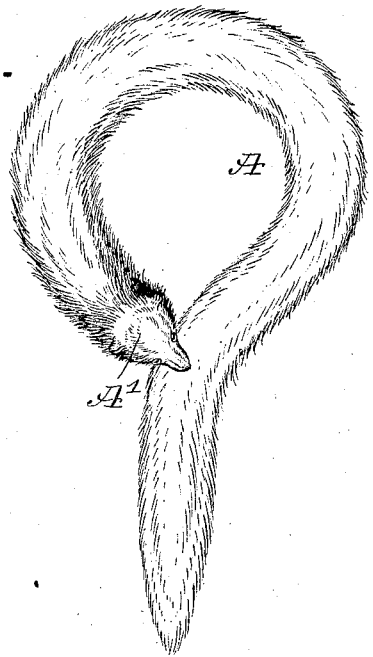
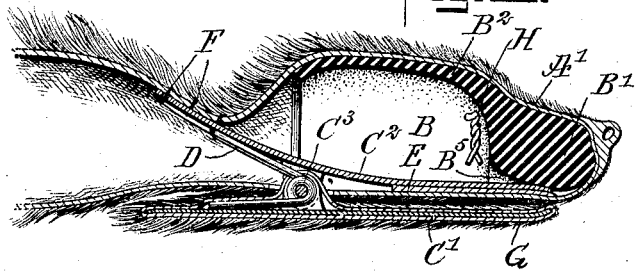
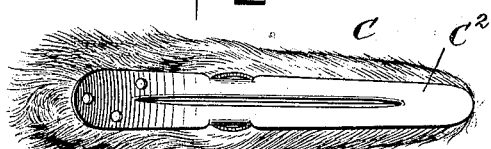
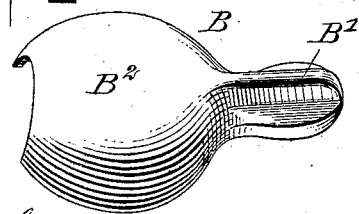
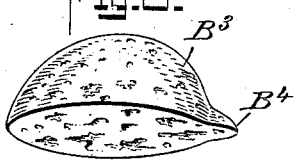
WITNESSES
INVENTOR
Bernard Cohen
BY
ATTORNEYS

UNITED STATES PATENT OFFICE.

BERNARD COHEN, OF NEW YORK, N. Y.

ANIMAL-HEAD.

No. 832,456.  Specification of Letters Patent.  Patented Oct. 2, 1906.

Application filed April 24, 1906. Serial No. 313,462.

*To all whom it may concern:*

Be it known that I, BERNARD COHEN, a citizen of the United States, and a resident of the city of New York, borough of Manhattan, in the county and State of New York, have invented a new and Improved Animal-Head, of which the following is a full, clear, and exact description.

The invention relates to furs; and its object is to provide a new and improved animal-head for boas and other fur garments, fur rugs, and other fur articles, and arranged to properly display the head and still render the same flexible, to allow of conveniently placing the head-filling in position in the skin, and to draw the skin into place to give the proper shape to the head and to provide a fastening-jaw for clamping the head to a part of the garment of which the head is a part.

The invention consists of novel features and parts and combinations of the same, which will be more fully described hereinafter and and then pointed out in the claims.

A practical embodiment of the invention is represented in the accompanying drawings, forming a part of this specification, in which similar characters of reference indicate corresponding parts in all the views.

Figure 1 is a plan view of the improvement as applied to a fur boa. Fig. 2 is an enlarged sectional side elevation of the improvement. Fig. 3 is an enlarged plan view of the clamping device. Fig. 4 is a perspective view of the head-filling, and Fig. 5 is a perspective view of the temporary sustaining-block for the head-filling.

The animal-head A' of a boa or other fur garment A is provided with a filling B, made of rubber and having a snout portion B' and a hollow skull portion $B^2$ opened at the bottom and at the rear end, the snout portion having a central longitudinal rib on its upper face, as plainly illustrated in the drawings. This filling B is placed in position on the inner face of the skin of the head A', and the latter is then fashioned over the said filling B, so as to give a shape to the head A' corresponding to the filling B, the latter resembling as near as possible the head and snout portion of the animal. When fashioning the skin over the filling B, the skin is sufficiently wet to allow proper drawing of the skin and fashioning the same corresponding to the contour or outer surface of the filling B, and then the side edges of the skin are fastened together at the bottom of the filling B, and for this purpose pins or the like are usually employed, passing through the edges of the skin and into a block $B^3$, made of cork and temporarily placed into the hollow skull portion $B^2$ of the filling B. Thus by the arrangement described the pins are securely held in place to hold the skin tight until the latter is dried on the filling B to retain its shape over the filling. The edges of the skin are then sewed together in the usual manner, and then the pins, as well as the block $B^3$, are withdrawn to leave the filling B in position in the head A', it being, however, expressly understood that this filling B forms a mold for the skin of the head A'.

The forward end of the block $B^3$ is provided at the bottom with an offset $B^4$, fitting a corresponding recess $B^5$ in the bottom of the snout portion B' to hold the block $B^3$ against movement while in place in the filling B. After the block $B^3$ has been withdrawn from the filling B it is evident that the snout portion of the animal's head is comparatively solid, while the skull portion thereof is flexible, owing to the hollow skull portion $B^2$ of the filling B.

The head A' is preferably provided with a clamping device for fastening the head to another part of the garment, as indicated in Fig. 1, and for this purpose a lower jaw C is provided comprising clamping members C' $C^2$, preferably made of metal and pivotally connected with each other at $C^3$ and pressed on by a spring D to hold the forward ends of the members C' $C^2$ normally in a closed position. The upper member $C^2$ of the jaw C extends with its forward end between the bottom of the head-skin and the bottom of the filling B, and this forward end is fastened into position on the skin, preferably by cement E or other suitable binding substance. The rear end of the upper member $C^2$ is attached by stitches F or the like to the top of the skin immediately in the rear of the head A', as plainly indicated in Fig. 2. The lower member C' of the jaw C is completely covered with fur G, so that the entire head of the animal, including the jaw, appears as natural as possible. At the same time the operator by pressing the rear end of the lower member C' opens the jaw C to engage the forward ends of the members C' $C^2$ with another part of the garment A, as indicated in Fig. 1.

The animal's head is provided with the usual eyes fastened in place by wires H or other means extending through the head-skin and the filling B to the inside of the hollow skull portion B², as plainly indicated in Fig. 2.

Having thus described my invention, I claim as new and desire to secure by Letters Patent—

1. An animal-head, comprising a head of a fur skin, and a form of soft rubber over which the skin is fashioned, said form comprising a hollow skull portion open at the bottom and a snout portion.

2. An animal-head, comprising a head of a fur skin, and a form of soft rubber over which the skin is fashioned, said form comprising a hollow skull portion open at the bottom and a snout portion having a central longitudinal rib on its upper face.

3. An animal-head, comprising a head of a fur skin, a form over which the skin is fashioned and having a skull portion and a snout portion, and a separate lower clamping-jaw comprising a pair of pivoted and spring-pressed clamping members, of which the upper member has its forward end extending between the bottom of the form and the bottom of the skin, the rear end of the said upper member being secured to the skin in rear of the form.

4. An animal-head, comprising the head of a fur skin, a form for the same made of rubber and over which the skin is fashioned, and a separate lower clamping-jaw comprising a pair of pivoted spring-pressed clamping members of which the upper member has its forward end extending between the bottom of the rubber form and the bottom of the skin, the rear end of the said upper member being secured to the top of the skin in the rear of the said form.

5. An animal-head, comprising the head of a fur skin, a form for the same made of rubber and over which the skin is fashioned, and a separate lower clamping-jaw comprising a pair of pivoted spring-pressed clamping members of which the upper member has its forward end extending between the bottom of the rubber form and the bottom of the skin, the rear end of the said upper member being secured to the top of the skin in the rear of the said form, and the lower member being fur-covered and extending outside of the skin along the bottom thereof.

In testimony whereof I have signed my name to this specification in the presence of two subscribing witnesses.

BERNARD COHEN.

Witnesses:
THEO. G. HOSTER,
JNO. M. RITTER.